Feb. 11, 1941.   W. J. A. STURTZ   2,231,230
LICENSE HOLDER
Filed Oct. 19, 1939
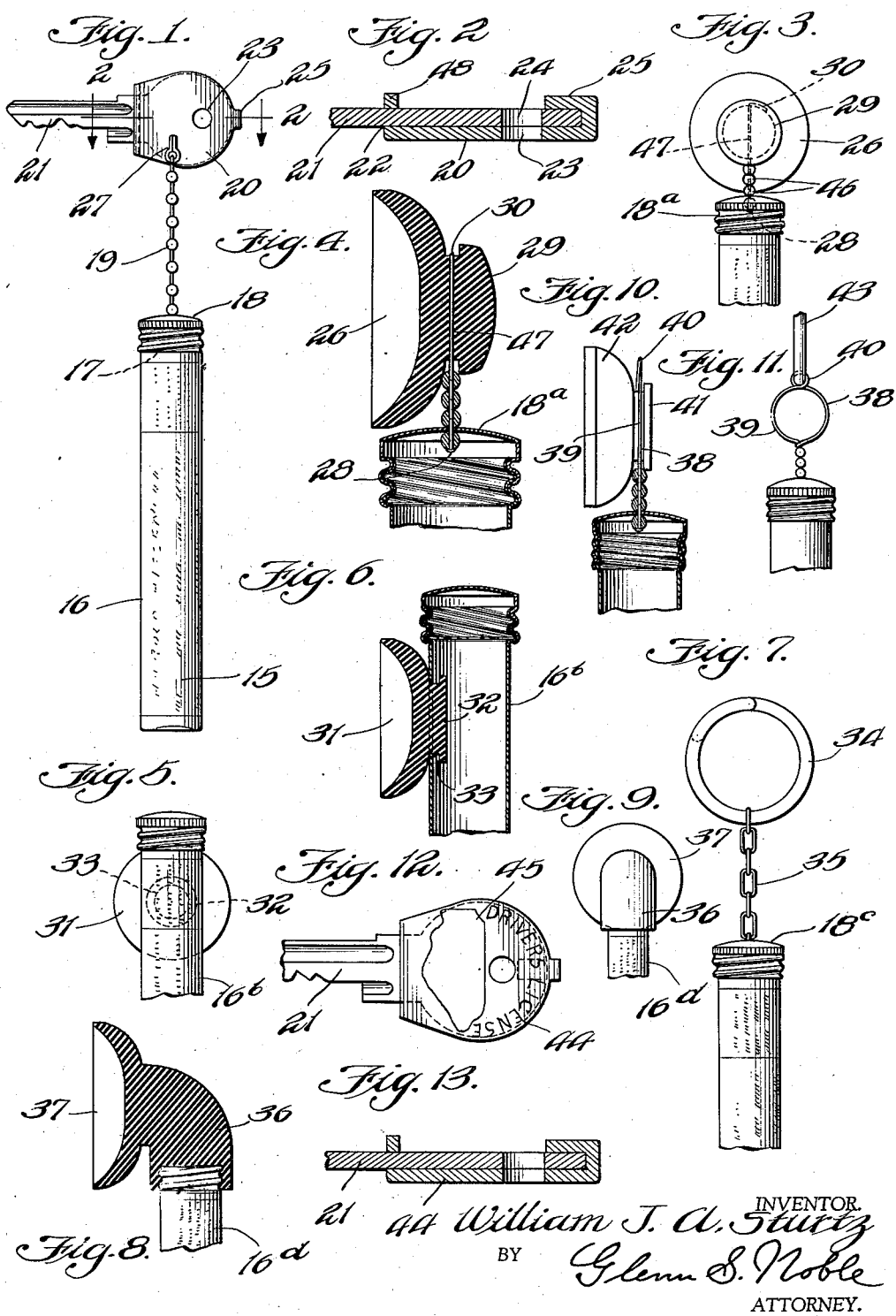

Patented Feb. 11, 1941

2,231,230

UNITED STATES PATENT OFFICE 2,231,230

LICENSE HOLDER

William J. A. Sturtz, Chicago, Ill.

Application October 19, 1939, Serial No. 300,146

2 Claims. (Cl. 40—19)

All or most of the States require licenses for automobiles and some States also require licenses for the drivers or operators. It is also customary to furnish small license cards to show such registrations or licenses. Some States require that these licenses be kept in the car or vehicle and other States require that the owner or operator shall have the license in his possession when driving a car. The present invention relates to means for conveniently carrying such licenses or for fastening the licenses in the vehicle and to other indicating or marking devices as will be described hereinafter.

One of the principal objects of the invention is to provide a convenient holder which will fully protect the license but which is sufficiently transparent to permit the license to be readily seen or read without removing from the container.

Other objects are to provide a transparent container or holder for license cards and means for attaching the same to various other devices, such as a key, key ring, or to the windshield or other parts of a vehicle; to provide a simple and efficient device of the character set forth which may be economically made and sold for a low price; and to provide such other advantages and desirable features as will appear hereinafter.

In the accompanying drawing illustrating this invention,

Figure 1 is a side view of a key with a supporting and identifying tag applied thereto with the license holder secured to said tag;

Figure 2 is an enlarged sectional detail of the key and tag or plate;

Figure 3 is a front view showing a modified form of construction with a suction cup for supporting the device;

Figure 4 is an enlarged sectional view of the cup and attached members shown in Figure 3;

Figure 5 is a front view showing a modified form with the holder or receptacle secured directly to the suction cup;

Figure 6 is an enlarged sectional view of the form shown in Figure 5;

Figure 7 shows a modified arrangement with means for securing the receptacle to a key ring;

Figure 8 is a sectional detail showing a modification in which the receptacle is attached directly to the suction cup;

Figure 9 is a front view of the device shown in Figure 8;

Figure 10 is a modification with different means for attaching the receptacle to a suction cup;

Figure 11 is a front view showing the supporting loop illustrated in Figure 10 as used for engagement with a key ring;

Figure 12 is a front view showing a modification in which the tag applied to the key is intended to bear the license number or other identification; and Figure 13 is a sectional view of the form shown in Figure 12.

The license or identification card is indicated at 15 and may be an automobile license, operator's license, or the like, and is mounted in a holder or receptacle 16 which may be of any suitable shape but which is preferably of tubular form and made of transparent, nonbreakable material on the order of Celluloid or other plastic material adapted for such purposes. One end of the holder is closed and the other end provided with threads 17 which are engaged by a correspondingly threaded cap 18, preferably formed of metal. The periphery of the holder is preferably such that the license or the essential portions thereof may be readily read without removing the card from the holder, which permits it to be inspected by an officer or anyone authorized for such purposes. As shown in Figure 1 the cap 18 is connected with one end of a chain or flexible connector 19, the opposite end of which is secured to a metallic tag or disc 20, preferably by means of a resilient or spring clip 21 having one end formed to engage with one of the balls of the chain and which may be pressed or sprung through a hole in the tag or through a hole in a key. The tag or disc 20 provides means for attaching to the car key 21. One side of the tag 20 has a lateral projection 48 with a slot 22 for receiving the blade portion of the key with the head lying against the tag, the tag being provided with a hole 23 which is in alignment with the usual hole 24 in the head of the key. The tag is fastened in position by a tang or projection 25 which is bent over the end of the key as shown. This provides a convenient arrangement for supporting and protecting the license and also to insure that the driver or operator will have the same when operating the car, which requires the use of the key.

When it is desired to mount or fasten the license in the car I provide a modified arrangement such as shown in Figures 3 and 4. In this arrangement the cap 18a is secured to a vacuum cup 26 by means of a wire 47. The wire extends through the cap and has a head 28 inside of the cap, the projecting portion extending through a knob or projection 29 on the vacuum cup. The end of the wire may be bent over as shown at 30 for securing it to the knob. The wire may also be provided with spacer beads 46.

With this arrangement the license may be conveniently supported within the car as by attaching the vacuum cup to the windshield or to any other suitable surface of the car.

In the modification shown in Figures 5 and 6 the tube or holder 16b is secured directly to the vacuum cup 31. This is conveniently done by providing a button portion 32 on the cup which is inserted through a hole 33 in the side of the holder, this button portion being sufficiently resilient to be projected through the hole and the inner end will expand to hold the parts together as readily seen from Figure 6.

Figure 7 shows a modification in which the cap 18c is connected to a key ring 34 by a chain or flexible connector 35.

Figures 8 and 9 show a modification in which the tube or holder 16d is screwed directly into threaded lug or stem 36 on a vacuum cup 37. This avoids the necessity for a cap and connecting means for connecting the holder to the vacuum cup.

Figures 10 and 11 show a modification in which the cap is provided with a fastening wire 38 having a relatively large loop or ring 39 and a small ring 40. The large ring provides means for buttoning the wire to a button 41 on a vacuum cup 42 for supporting the holder. The small ring or loop 40 provides means for engagement with a key ring 43 as shown in Figure 11.

Figures 12 and 13 show a modification in which identification is provided by means of a tag 44 which is secured to a key 21 as shown in Figures 1 and 2 but in this instance the tag is provided with identification means such as indicated at 45 to show the state and the driver's license number may be applied directly to the tab or disc or other identifying numbers or indicia may be applied thereto as desired.

Having thus described my invention, what I claim and desire to secure by Letters Patent is:

1. The combination with a vacuum cup having a button projecting therefrom, of a receptacle, a wire having one end secured to the receptacle and provided with two loops, one of said loops being adapted to engage with the button to fasten the receptacle to the cup, the other loop adapted to engage with a key ring, and spreader beads on said wire.

2. The combination with a vacuum cup having a projection thereon of a transparent tube for holding an automobile license or the like, and a wire having one end secured to the tube and provided with two loops, one of said loops being adapted to engage with the projection to fasten the tube to the cup, the other loop being adapted to engage with a key ring or the like.

WILLIAM J. A. STURTZ.